(12) United States Patent
Xiao

(10) Patent No.: US 12,146,605 B1
(45) Date of Patent: Nov. 19, 2024

(54) WALL MOUNT FOR DISPLAY DEVICE

(71) Applicant: Jolly Innovation Technology Co., Ltd., Guangzhou (CN)

(72) Inventor: Li Xiao, Guangzhou (CN)

(73) Assignee: Jolly Innovation Technology Co., Ltd., Guangzhou (CN)

( * ) Notice: Subject to any disclaimer, the term of this patent is extended or adjusted under 35 U.S.C. 154(b) by 0 days.

(21) Appl. No.: 18/424,665

(22) Filed: Jan. 26, 2024

(30) Foreign Application Priority Data

May 11, 2023 (CN) .......................... 202321142004.4

(51) Int. Cl.
*F16M 11/08* (2006.01)
*F16M 13/02* (2006.01)

(52) U.S. Cl.
CPC ............ *F16M 11/08* (2013.01); *F16M 13/02* (2013.01)

(58) Field of Classification Search
CPC . A47F 5/08; A47F 5/0807; A47F 5/10; A47G 1/08; A47G 1/16; A47G 1/1613; A47G 1/164; A47G 1/166; F16M 11/06; F16M 11/08; F16M 11/10; F16M 2200/063; F16M 2200/065; F16M 13/02
USPC ............... 248/919, 920, 921, 922, 923, 121, 248/123.11, 123.2
See application file for complete search history.

(56) References Cited

U.S. PATENT DOCUMENTS

| | | | |
|---|---|---|---|
| D558,561 S * | 1/2008 | Ciungan ...................... D14/452 |
| D559,662 S | 1/2008 | Sculler et al. | |
| 7,832,700 B2 * | 11/2010 | Ciungan ............ F16M 11/2085 | 248/281.11 |
| D640,709 S * | 6/2011 | Stoelinga ...................... D14/452 |
| 10,010,177 B1 * | 7/2018 | Pei .......................... F16M 13/02 |
| 10,663,106 B1 * | 5/2020 | Meskan ................. F16M 11/18 |
| D912,027 S | 3/2021 | Lyu | |
| 2008/0105633 A1 * | 5/2008 | Dozier ................... F16M 11/10 | 211/26 |
| 2008/0258029 A1 * | 10/2008 | Zhang .................... F16M 11/18 | 248/284.1 |

OTHER PUBLICATIONS

Kanto, "Full Motion Recessed Mounts R500" Oct. 12, 2021 online, specification. This specification is the product from "Everything You Need In-Wall TV Mounts" in application's IDS filed on Jan. 26, 2024. (Year: 2021).*
Everything You Need In-Wall TV Mounts Kanta R300 & R500, posted Oct. 12, 2021 [online], https://www.youtube.com/watch?v=j448LBrQLHo.

* cited by examiner

*Primary Examiner* — Alfred J Wujciak
(74) *Attorney, Agent, or Firm* — ScienBiziP, P.C.

(57) ABSTRACT

The present invention provides a wall mount for display device, comprising a metal piece directly fixedly mounted to a surface of a wall; an adjustable back plate; and a rotatable supporting member; the rotatable supporting member comprises a rear arm, a middle arm and a front arm, wherein a first storage space is formed in the rear arm, a second storage space is formed in the middle arm, so that the middle arm is accommodated in the first storage space in a stacked manner, one end of the front arm is rotationally connected to the other end of the middle arm, so that the front arm is accommodated in the second storage space in a stacked manner, the other end of the front arm is rotationally connected with the adjustable back plate; a distance between the display device and the wall is adjusted by changing the stacked manner.

10 Claims, 8 Drawing Sheets

WALL MOUNT FOR DISPLAY DEVICE

RELATED APPLICATIONS

This application claims the benefit of priority to Chinese Patent Application Number 202321142004.4 filed on May 11, 2023, in the China National Intellectual Property Administration. The entire contents of the above-identified application are hereby incorporated by reference.

TECHNICAL FIELD

The present disclosure relates to the technical field of racks, specifically relates to a wall mount for a display device.

BACKGROUND

As people's living standard has improved, the functions of display device, such as television sets and display panels on the market are becoming more and more diversified. The television set can not only be used as a household to watch television programs, but also can be used for commercial purposes such as live broadcast and learning. Therefore, due to the demand for multi-angle functions of the television, a wall mount for display device capable of multi-angle adjustment of the television emerges.

In the case of limited space, how to adjust a television to a wider range of angles by using a television supporting rack is of great significance. Therefore, there is a need for a wall mount for display device that solves the described problem.

SUMMARY OF INVENTION

In view of the described problems, the present disclosure provides a wall mount for display device capable of adjusting different angles.

The wall mount for display device includes a wall fixing member made from a metal piece, which including a body directly fixedly mounted to a surface of a wall and at least one engaging structure provided on the body and configured to fix the body to a surface of the wall; a rotatable supporting member; and an adjustable back plate, the wall fixing member fixedly mounted on the wall, the rotatable supporting member movably connected to the wall fixing member and the adjustable back plate, and the adjustable back plate for fixing the display device, wherein the rotatable supporting member comprises a rear arm, a middle arm and a front arm, the rear arm, the middle arm and the front arm are sequentially arranged between the wall fixing member and the adjustable back plate, wherein a first storage space is formed in the rear arm, and the rear arm is rotationally connected to the wall fixing member, a second storage space is formed in the middle arm, and one end of the middle arm is rotationally connected to the other end of the rear arm, so that the middle arm is accommodated in the first storage space in a stacked manner, one end of the front arm is rotationally connected to the other end of the middle arm, so that the front arm is accommodated in the second storage space in a stacked manner, and the other end of the front arm is rotationally connected with the adjustable back plate.

In other embodiments, the wall mount for display device, comprising: a metal piece directly fixedly mounted to a surface of a wall; an adjustable back plate configured to fix the display device; and a rotatable supporting member movably connected to the metal piece and the adjustable back plate; wherein the rotatable supporting member comprises a rear arm, a middle arm and a front arm, the rear arm, the middle arm and the front arm are sequentially arranged between the metal piece and the adjustable back plate; wherein a first storage space is formed in the rear arm, and the rear arm is rotationally connected to the metal piece, a second storage space is formed in the middle arm, and one end of the middle arm is rotationally connected to the other end of the rear arm, so that the middle arm is accommodated in the first storage space in a stacked manner, one end of the front arm is rotationally connected to the other end of the middle arm, so that the front arm is accommodated in the second storage space in a stacked manner, the other end of the front arm is rotationally connected with the adjustable back plate; and a distance between the display device and the wall is adjusted by changing the stacked manner of the arms.

According to the wall mount for display device design in the present disclosure, the stability is higher and the multi-angle adjustment of the television can be achieved.

DETAILED DESCRIPTION

It is important to note that the embodiments of the present disclosure and the features in the embodiments can be combined under the condition of no conflicts. Preferred embodiments of the present disclosure is described in detail with reference to the drawings as follow.

Figure 1:
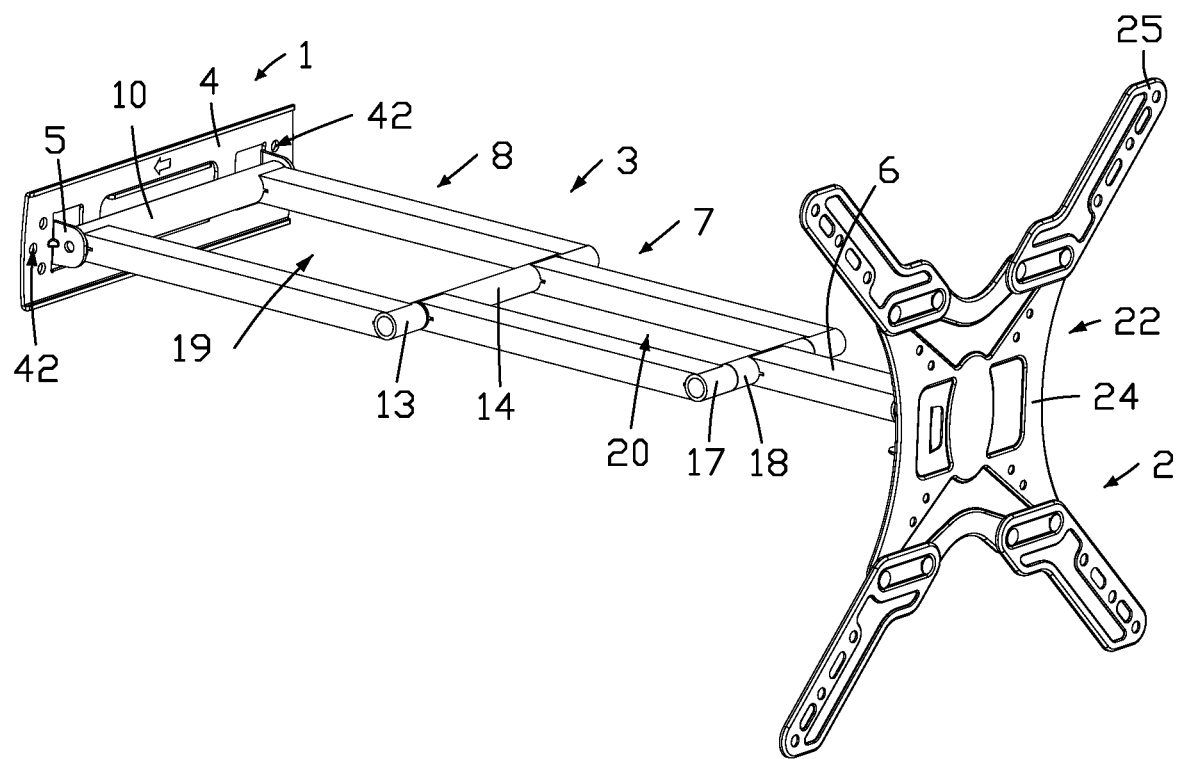
FIG. 1 is a structural schematic diagram of a wall mount for display device according to the present embodiment.
Figure 2:
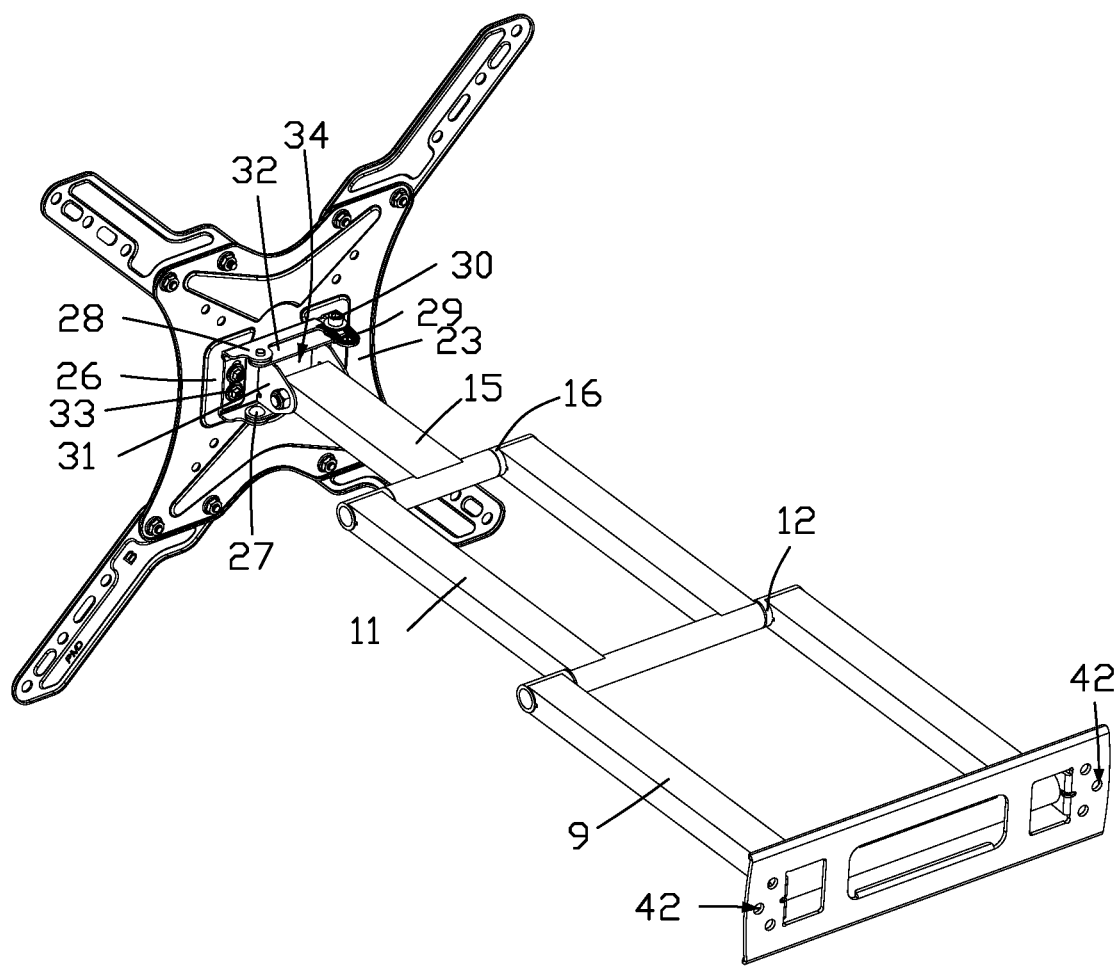
FIG. 2 is a structural schematic diagram of a wall mount for display device according to the present embodiment.
Figure 3:
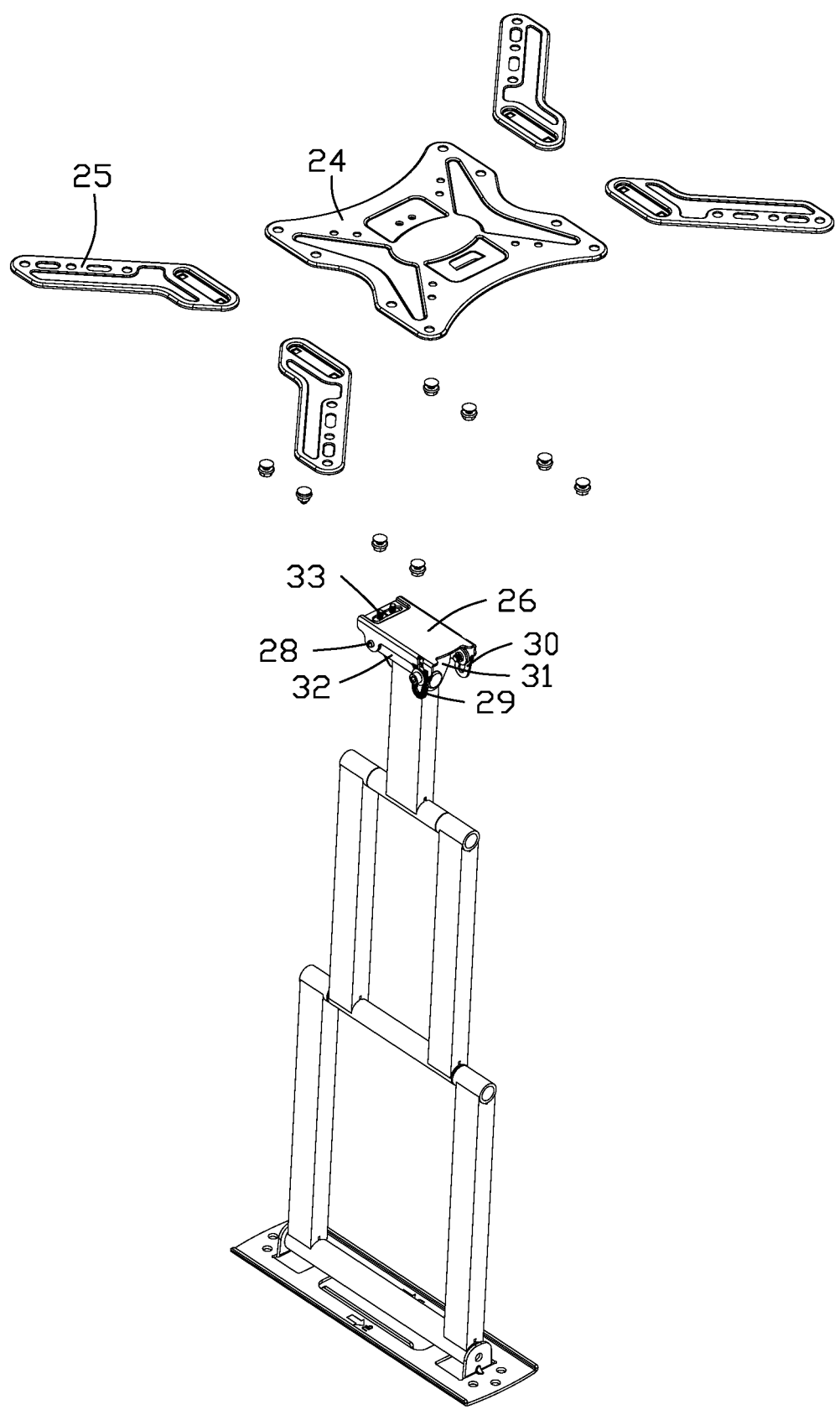
FIG. 3 is a partial exploded view of FIG. 1.

As shown in FIGS. 1-3, the wall mount for display device 100 of the present embodiment is configured for hanging a display device, e.g. a television, on the wall. As shown in FIG. 1, the wall mount for display device 100 includes a wall fixing member 1 fixedly mounted on the wall, an adjustable back plate 2 for fixing the television, and a rotatable supporting member 3 for connecting the wall fixing member 1 and the adjustable back plate 2.

The wall fixing member 1 is made from a metal piece, which includes a body 4 and two connecting protrusions 5. The body 4 can be for example a rectangular metal piece and directly fixedly mounted to a surface of the wall. That is, the wall fixing member 1 is capable of directly fixing on the surface of the wall, and therefore there is no need to dig a hole in the wall to accommodate the wall fixing member 1. In some embodiments, the wall fixing member 1 may also be a surface mount directly fixedly mounted to an attachment surface in a non in-wall mounted manner. The two connecting protrusions 5 are respectively located at one side of the body 4 away from the wall, and the two connecting protrusions 5 respectively protrude from two ends of the body 4. Compared with a fixing member that require installing two wooden columns in the wall, the structure of the wall fixing member 1 of the present enclosure has a certain stability, and only one wooden column needs to be installed in the wall, thereby improving the convenience of installation while saving materials. Two engaging structures are also respectively provided on two opposite sides of the wall fixing member 1 and are configured to fix the wall fixing member 1 to the wall. In the embodiment, the engaging structure can be for example a set of screw holes 42.

The rotatable supporting member 3 is a foldable multi-segment structure, for example, including a front arm 6, a middle arm 7 and a rear arm 8 which are sequentially connected. The rear arm 8 includes two first rotation arms 9 arranged in parallel and a first pivot member 10. Two ends of the first pivot member 10 are rotationally connected to the two connecting protrusions 5, so that the rotatable supporting member 3 is rotationally connected to the wall fixing member 1. The two first rotation arms 9 are respectively fixedly connected to two ends of the first pivot member 10, so that the two first rotation arms 9 rotate together with the first pivot member 10, and thus the rear arm 8 is rotationally connected to the wall fixing member 1. A first storage space 19 is formed between the two first rotation arms 9 for storing the middle arms 7. In the embodiment, the first storage space 19 is shaped as a rectangular shape having its short sides parallel to the first pivot member 10. Due to the long sides of the first storage space 19 is parallel the ground, the rotatable supporting member 3 can reach longer arm lengths in an unfolded status. Moreover, due to the short sides of the first storage space 19 coupled to the first pivot member 10, cooperating with smaller-sized wall fixing member 3, the wall mount adapts to hanging on multiple different sizes of the wall. For example, the wall mount can be more easily hung in the wall corners, which has a limited space.

The middle arm 7 includes two second rotation arms 11 arranged in parallel and a second pivot member 12. The second pivot member 12 is connected to the rear arm 8, and the second pivot member 12 includes a first rotation portion 13 and a second rotation portion 14 that are rotationally disposed with each other. The two first rotation arms 9 are fixedly connected to two ends of the first rotation portion 13, and the second rotation portion 14 is rotationally connected to the two second rotation arms 11, so that the middle arm 7 is rotationally connected to the rear arm 8, further, the two second rotation arms 11 are fixedly connected to the second rotation portion 14, thereby the two second rotation arms 11 rotate together with the second rotation portion 14, and then the rear arm 8 is rotationally connected to the middle arm 7 and is accommodated in the first storage space 19, so that the middle arm 7 is folded and accommodated relative to the rear arm 8. A second storage space 20 for accommodating the front arm 6 is formed between the two second rotation arms 11. In the embodiment, the second storage space 20 is also shaped as a rectangular having its short sides parallel to the second pivot member 10, and is also accommodated into the first storage space 19.

The front arm 6 includes a third rotation arm 15 and a third pivot member 16. The third pivot member 16 is connected to the middle arm 7, and the third pivot member 16 includes a third rotation portion 17 and a fourth rotation portion 18 rotationally arranged with each other. Two ends of the third rotation portion 17 are fixedly connected to the two second rotation arms 11. The fourth rotation portion 18 is fixedly connected to one third rotation arm 15, so that one third rotation arm 15 is rotationally connected to the fourth rotation portion 18, and further can be accommodated in the second storage space 20, so that the front arm 6 can be folded and accommodated relative to the middle arm 7. In addition, the second pivot member 12 is thicker than the third pivot member 16, and the first pivot member 10 is thicker than the second pivot member 12, that is, the closer to the wall fixing member 1, the thicker the pivot member. The wall mount for display device 100 is a lever taking the wall fixing member 1 as a fulcrum, and the closer the pivot member is to the wall fixing member 1, the larger the force applied to the pivot member is. Therefore, by the setting of the pivot member closer to the wall fixing member 1 to be thicker, it can be ensured that the strength of each pivot member is sufficient, so that the wall mount for display device 100 is not easy to deform. Meanwhile, the farther away from the wall fixing member 1 the pivot member is, the longer the arm of force is, and the farther away from the wall fixing member 1 the thinner the pivot member is, the smaller the dead weight of the pivot member is, which can reduce the value of the moment generated by the wall fixing member, and is beneficial to reduce the overall weight of the wall mount for display device 100.

Specifically, both the middle arm 7 and the rear arm 8 are configured as two rotation arms arranged in parallel, and the front arm 6, the middle arm 7 and the rear arm 8 are formed a telescope structure, the middle arm 7 can be accommodated in the first storage space 19 in a stacked manner, and the front arm 6 may be accommodated in the second storage space 20 in a stacked manner, The stability of the whole structure is increased, the reliability of the structure is improved, and the middle arm 7, the rear arm 8 and the front arm 6 of the wall mount for display device 10 are folded, thus, different angles can be adjusted.

One end of the third rotation arm 15 away from the third pivot member 16 is rotationally connected with the adjustment back plate 21. The adjustment back plate 21 includes a back plate 22 fixed to the television and an adjustment assembly (not shown) connected to the back plate 22. The adjustment assembly (not shown) includes a fixing seat 26 and an adjustment member 27. The adjustment member 27 is rotationally connected to the third rotation arm 15 of the front arm 6. The adjustment member 27 includes two first connecting parts 31, two second connecting parts 32 and a bottom (not shown). The bottom (not shown) has a plate shape, the two first connection portions 31 protrude from two opposite sides of the bottom (not shown), and a receiving groove 34 is formed between the two first connection parts 31. One end of the third rotation arm 15 is received in the receiving groove 34, and is fixedly connected to one end of the third rotation arm 15 by two screws (not shown), so that the third rotation arm 15 can rotate around a axis relative to the first connecting part 32. The two first connecting parts 31 are arranged to protrude towards the direction away from the back plate 22 and perpendicular to the fixing seat 26, the two second connecting parts 32 are arranged to protrude perpendicular to the fixing seat 26, and the first connecting parts 31 and the second connecting parts 32 form an accommodating groove 34 on the fixing seat. The two second connecting parts 32 extend and protrude along the other two opposite sides of the bottom (not shown), and are arranged perpendicular to the two first connecting parts 31, so that the bottom (not shown), a portion of the two second connecting parts 32 and the two first connecting parts 31 form one receiving groove 34 together. The two second connecting parts 32 protrude outwards relative to the two first connecting parts 31 and are rotationally connected to the fixing seat 26.

The fixing seat 26 includes two pivoting protrusions 28 and two adjustment protrusions 29. The two adjustment protrusions 29 form an adjusting sliding groove 30. The adjustment member 27 is rotationally mounted to the fixing seat 26, and the rotatable supporting member 3 can rotate relative to the adjustment member 27 to adjust the angle of the television.

One end of the second connecting part 32 is rotationally connected to the pivoting protrusion 28, and the other end of the second connecting part 32 is rotationally connected to the adjustment protrusion 29. Each adjusting protrusion 29 includes an adjusting sliding groove 30, and the angle of the television can be adjusted by sliding the adjusting protrusion 29 along the adjusting sliding groove 30 to a suitable position. The height of the pivotal protrusion 28 is consistent with the height of the second connecting part 32, and the height of the adjusting protrusion 29 is higher than that of the second connecting part 32, so that the adjustable range of angles is wider. In this implementation, the adjusting sliding slot 30 is a curved sliding slot, and shapes of the adjusting sliding slot 30 are designed differently according to actual situations.

The back plate 22 includes a mounting board 24 and four connecting plates 25. The fixing seat 26 is fixed to the mounting board 24 by two fixing members 33. The periphery of the mounting board 24 is of an arc-shaped design, and a total of eight small holes are provided along the diagonal direction of the mounting board 24, so that heat dissipation can be performed when the television operates. The four corners of the mounting board 24 are respectively provided with two fixing pieces (not shown), the four connecting plates 25 are respectively fixed to the mounting board 24 by the two fixing pieces, and each connecting plate is provided with three circular heat dissipation holes (not shown), one elliptical heat dissipation hole (not shown), and two load-bearing protrusions (not shown). By means of the stability of the structure, the weight to which the mounting board can withstand is increased.

The assembling process of the wall mount for display device 100 is described with reference to FIGS. 1-3. The wall fixing member 1 is fixed to the wall via a wooden column; the rear arm 8 is rotationally connected to the wall fixing member 1 via the first pivot member 10; the middle arm 7 is rotationally connected to the rear arm 8 via the second pivot member 12; the front arm 6 is rotationally connected to the middle arm 7 via the third pivot member 16; the adjustment back plate 21 is rotationally connected to the front arm 6 via an adjustment assembly (not shown); and the television is fixed on the adjustment back plate 21.

Use scenarios of the wall mount for display device 100 are described with reference to FIG. 4 to FIG. 8.

Figure 4:
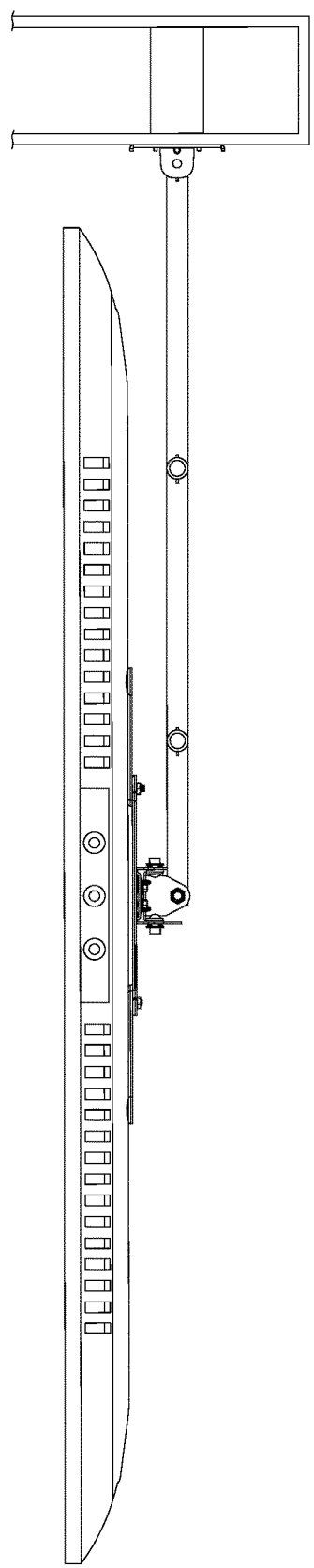
FIG. 4 is a diagram of a usage scenario of the wall mount for display device according to the present embodiment.

As shown in FIG. 4, when the front arm 6, the middle arm 7 and the rear arm 8 rotate to the same straight direction, and the adjustment assembly (not shown) rotates to be perpendicular to the rotation axis direction and towards the left side, the television is located on the left front side of the wall body, so that the television can be located at a position perpendicular to the wall, thereby realizing the front view of the television at different positions, and achieving a better use experience.

Figure 5:
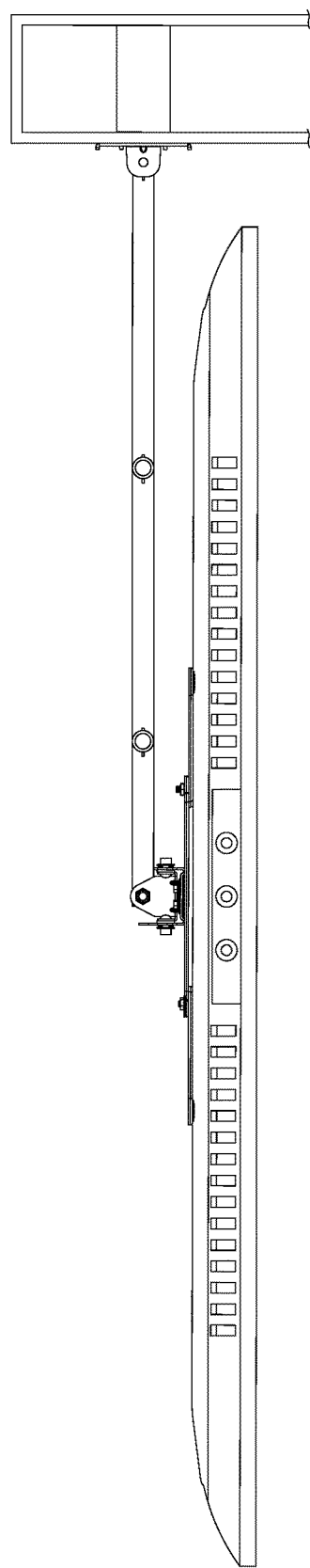
FIG. 5 is a diagram of a usage scenario of the wall mount for display device according to the present embodiment.

As shown in FIG. 5, when the front arm 6, the middle arm 7 and the rear arm 8 rotate to the same straight direction, and the adjustment assembly (not shown) rotates to be perpendicular to the rotation axis direction and towards the right side, the television is located at the front right side of the wall, so that the television can be located at a position perpendicular to the wall, thereby realizing the front view of the television at different positions, and achieving a better use experience.

Figure 6:
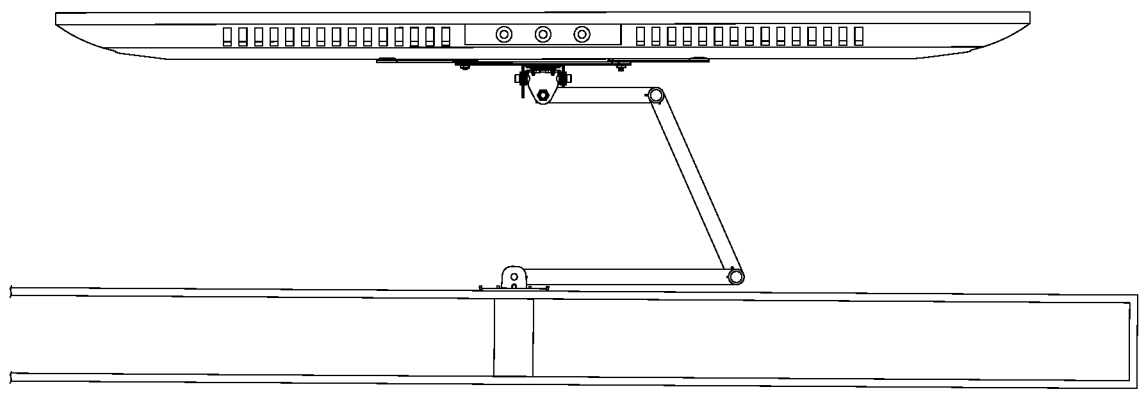
FIG. 6 is a diagram of a usage scenario of the wall mount for display device according to the present embodiment.
Figure 7:
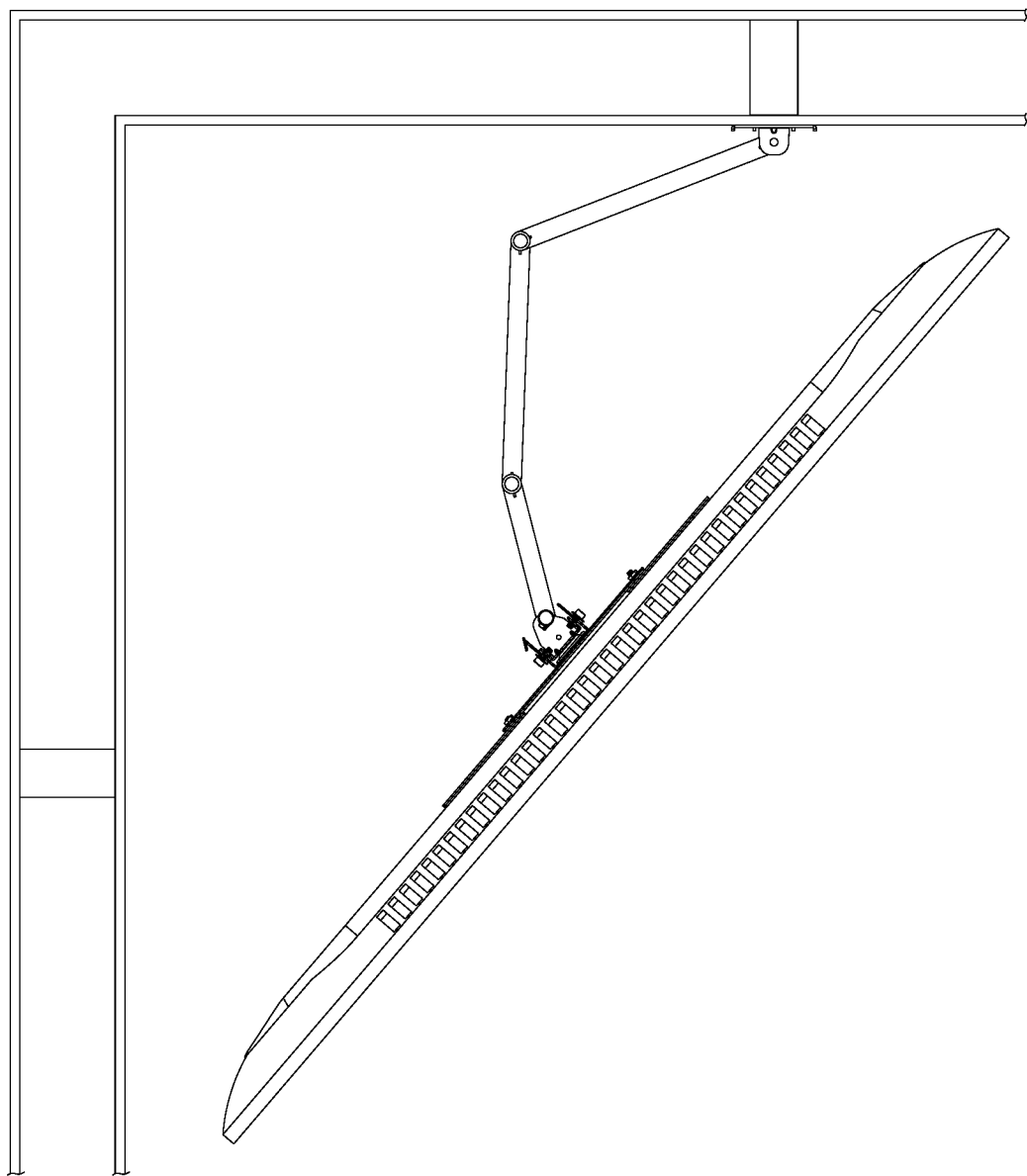
FIG. 7 is a diagram of a usage scenario of the wall mount for display device according to the present embodiment.

As shown in FIGS. 6 and 7, the present wall mount for display device can be rotated to an appropriate angle at a front side of a wall according to needs, and can be rotated to be located at a corner position, thereby saving space; and the television can be closer to a person, or the television can be further away from the person, thereby satisfying the requirements of viewing at different distances between the person and the television, so that the use experience is better.

Figure 8:
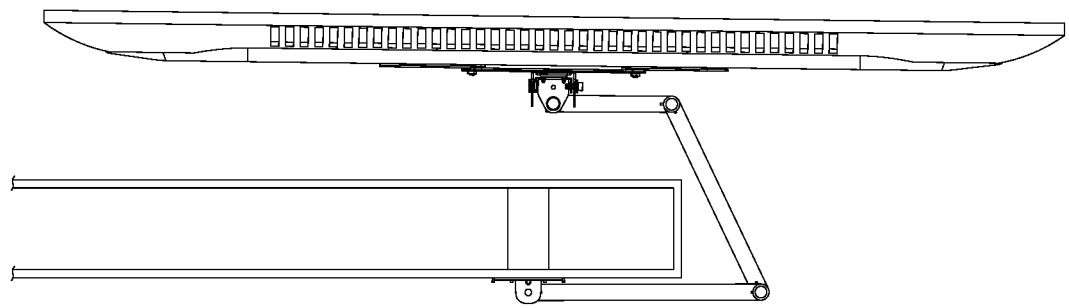
FIG. 8 is a diagram of a usage scenario of the wall mount for display device according to the present embodiment.

As shown in FIG. 8, the television rack of the present invention can also rotate to the rear side of the wall for viewing, so that the television can also be viewed on the front side on the back side of the wall without carrying the television, thereby having a better use experience.

As shown in FIG. 8, when the rear arm 8 is rotated in the horizontal direction, the middle arm 7 is bent in the rear side direction of the wall, and the front arm 6 is rotated in the horizontal direction, the front arm 6, the middle arm 7, and the rear arm 8 form a U-shape.

It should be understood that the foregoing embodiments are merely intended to describe the technical solutions of the present disclosure, but not intended to limit the present disclosure. For persons skilled in the art, modifications may be made to the technical solutions described in the foregoing embodiments, or equivalent replacements may be made to some technical features in the technical solutions; All these modifications and replacements should belong to the scope of protection of the appended claims of the present disclosure.

What is claimed is:

1. A wall mount for display device, comprising:
    a metal piece directly fixedly mounted to a surface of a wall;
    an adjustable back plate configured to fix the display device; and
    a rotatable supporting member movably connected to the metal piece and the adjustable back plate;
    wherein the rotatable supporting member comprises a rear arm, a middle arm and a front arm, the rear arm, the middle arm and the front arm are sequentially arranged between the metal piece and the adjustable back plate;
    wherein a first storage space is formed in the rear arm, and the rear arm is rotationally connected to the metal piece, a second storage space is formed in the middle arm, and one end of the middle arm is rotationally connected to the other end of the rear arm, so that the middle arm is accommodated in the first storage space in a stacked manner, one end of the front arm is rotationally connected to the other end of the middle arm, so that the front arm is accommodated in the second storage space in a stacked manner, the other end of the front arm is rotationally connected with the adjustable back plate; and a distance between the display device and the wall is adjusted by changing the stacked manner of the arms, and
    wherein the metal piece further comprises a body and two connecting protrusions each extending from one side of the body away from the wall, the rear arm comprises two first rotation arms and a first pivot member, the first pivot member is rotationally connected to the two connecting protrusions, and the two first rotation arms are arranged parallel to each other and fixedly connected to the first pivot member, and the first storage space is formed between the two first rotation arms.

2. The wall mount for display device according to claim 1, wherein the adjustable back plate comprises a mounting board fixedly connected with a rear surface of the display device and an adjustment assembly, the adjustment assembly comprises a fixing seat and an adjustment member, the fixing seat is fixedly mounted on the mounting board, the adjusting member is rotationally mounted on the fixing seat and is rotationally connected to one end of the front arm of the rotatable supporting member, so that the rotatable supporting member rotates relative to the adjustment member to adjust the angle of the display device.

3. The wall mount for display device according to claim 2, wherein the adjustment member comprises two first connecting parts, the two first connecting parts protrude towards the direction away from the mounting board, and an accommodating groove is formed between the two first connecting parts, one end of the front arm is received in the accommodating groove and is rotationally connected to the two first connecting parts.

4. The wall mount for display device according to claim 1, wherein the first storage space is shaped as a rectangular shape having its short sides parallel to the first pivot member.

5. The wall mount for display device according to claim 4, wherein the middle arm comprises two second rotation arms and a second pivot member, the second pivot member is rotationally connected to one end of the two first rotation arms away from the metal piece, the two second rotation arms are arranged parallel to each other and are rotationally connected to the two first rotation arms via the second pivot member, and the second storage space is formed between the two second rotation arms.

6. The wall mount for display device according to claim 5, wherein the first pivot member is thicker than the second pivot member.

7. The wall mount for display device according to claim 6, wherein the front arm includes a third rotation arm and a third pivot member, the third pivot member is rotationally connected to one end of the two second rotation arms away from the rear arm, one end of the third rotation arm is rotationally connected to the third pivot member, the other end of the third rotation arm is rotationally connected with the adjustable back plate.

8. The wall mount for display device according to claim 7, wherein the second pivot member is thicker than the third pivot member.

9. The wall mount for display device according to claim 7, wherein the second pivot member includes a first rotation portion and a second rotation portion that are rotationally disposed with each other, the first rotation portion is fixedly connected to one end of the two first rotation arms, and the second rotation portion is fixedly connected to one end of the two second rotation arms, the third pivot member comprises a third rotation arm and a fourth rotation portion that are rotationally disposed with each other, the third rotation arm are fixedly connected to the other end of the two second rotation arms, and the fourth rotation portion is fixedly connected to one end of the third rotation arms.

10. The wall mount for display device according to claim 5, wherein the second storage space is also shaped as a rectangular having its short sides parallel to the second pivot member, and is accommodated into the first storage space.

\* \* \* \* \*